United States Patent
Muckler

[11] Patent Number: 5,899,170
[45] Date of Patent: May 4, 1999

[54] LIVESTOCK FEEDER

[76] Inventor: Gregory A. Muckler, R.R. 2, Box 50A, Grinnell, Iowa 50112

[21] Appl. No.: 08/971,444

[22] Filed: Nov. 17, 1997

[51] Int. Cl.⁶ ...................................................... A01K 5/01
[52] U.S. Cl. ................................................ 119/58; 119/60
[58] Field of Search ................................... 119/58, 60, 65, 119/68, 69, 61, 51.5, 52.1, 54, 55, 51.11, 51.12, 51.04

[56] References Cited

U.S. PATENT DOCUMENTS

| | | |
|---|---|---|
| 387,892 | 8/1888 | Light . |
| 1,398,041 | 11/1921 | Pfeifer . |
| 2,419,834 | 4/1947 | Grindstaff . |
| 3,074,377 | 1/1963 | Spencer . |
| 3,205,860 | 9/1965 | Moore . |
| 3,777,713 | 12/1973 | Deats .......................................... 119/60 |
| 3,999,520 | 12/1976 | Feter ........................................... 119/58 |
| 4,419,963 | 12/1983 | Willibrordus . |
| 4,483,274 | 11/1984 | Zmolek et al. ............................. 119/61 |
| 4,706,609 | 11/1987 | Delichte ..................................... 119/60 |
| 5,522,345 | 6/1996 | Payne ......................................... 119/60 |

*Primary Examiner*—Michael J. Carone
*Assistant Examiner*—Yvonne R. Abbott
*Attorney, Agent, or Firm*—G. Brian Pingel

[57] ABSTRACT

The collapsible livestock feeder having a plurality of feeder sections pivotally secured to one another. Each feeder section includes a feed retainer and a hold back. The feeder section retains feed therein for access by an animal. When the feed in the retainer has been eaten, the animal uses the hold back to move the feeder section inward to access additional feed. The feeder sections thereby collapse around the feed, and do not require movement of the entire feeder to access feed at the interior. The modularity of the feeder also allows for ease of take-down, transport and set up.

8 Claims, 8 Drawing Sheets

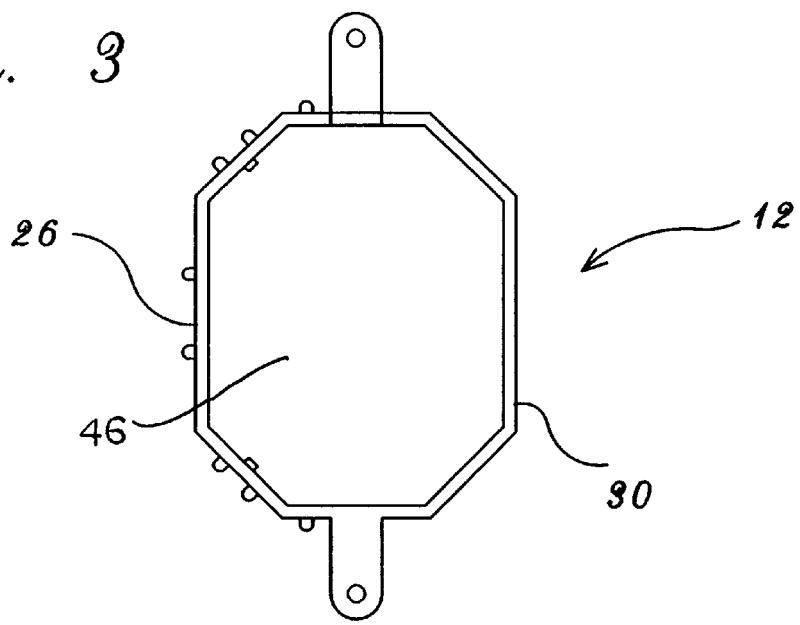
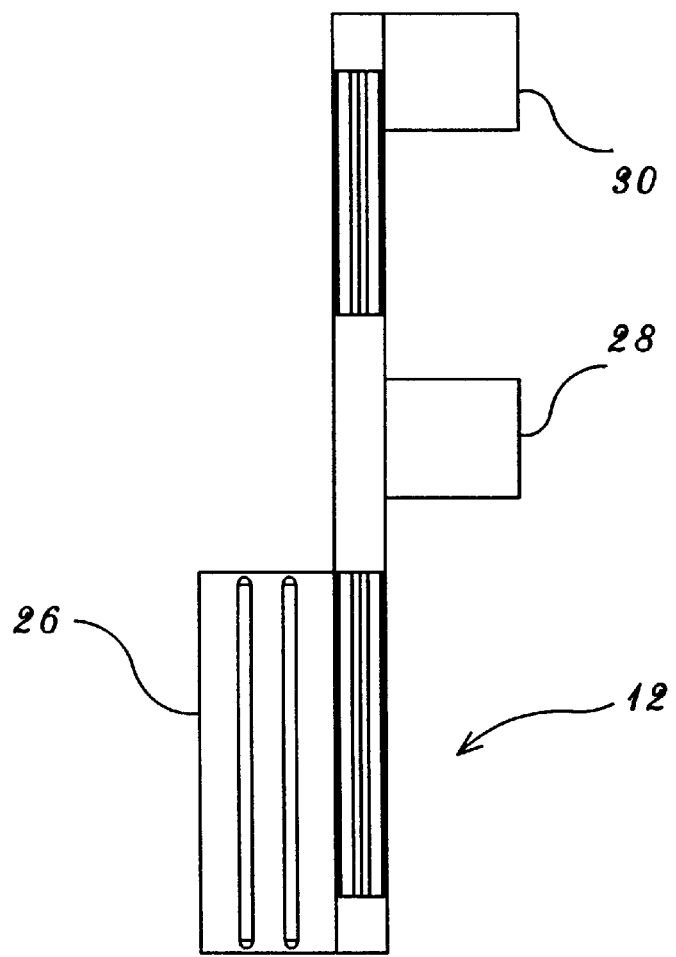

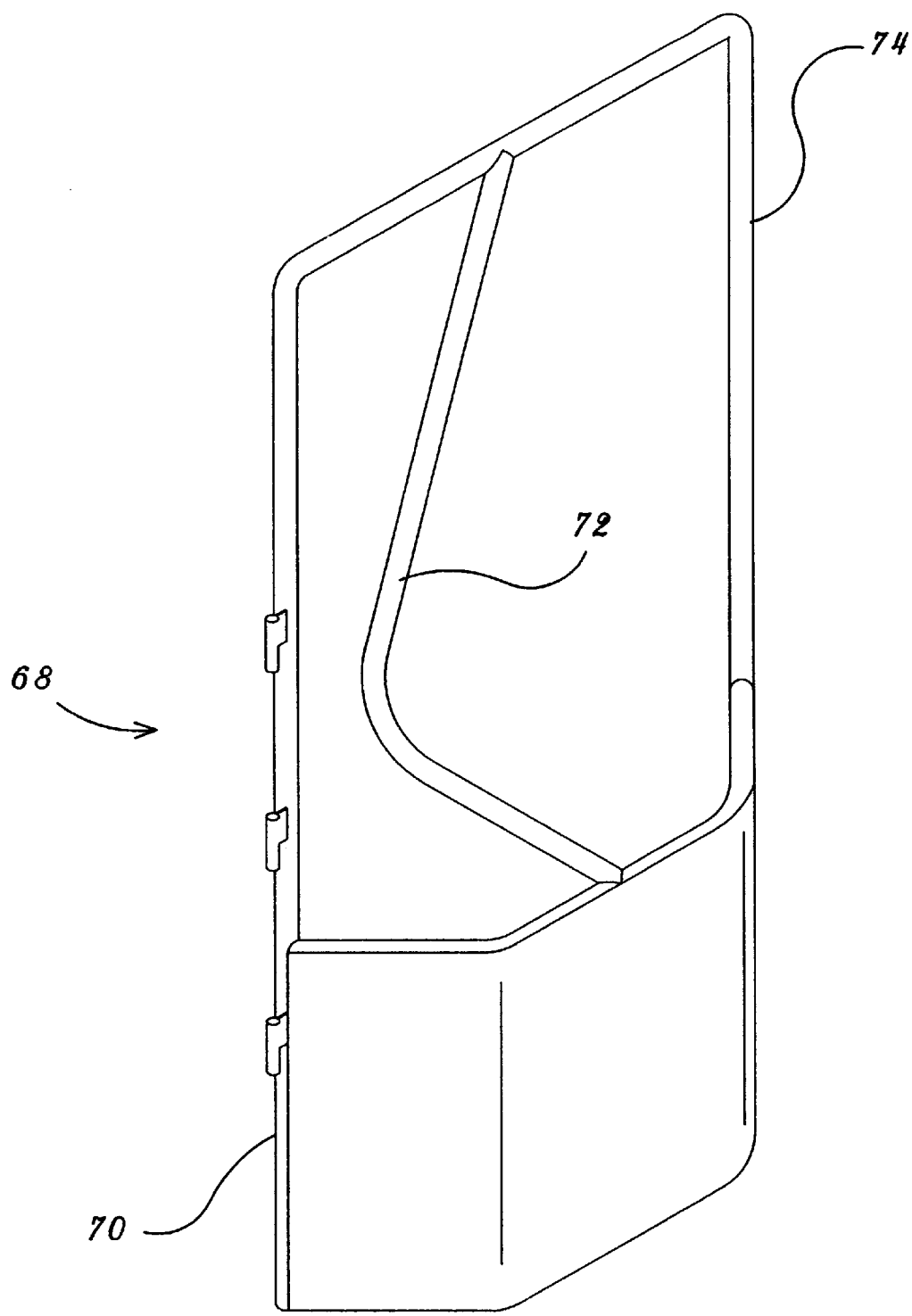

LIVESTOCK FEEDER

BACKGROUND OF THE INVENTION

1. Field of the Invention

The present invention relates in general to a livestock feeder, and, more specifically, to an adjustable livestock feeder which substantially prevents trampling of the feed while allowing livestock access to the feed.

2. Description of the Prior Art

It is known in the art to provide circular feeders for cylindrical bales of hay such as that described in U.S. Pat. No. 4,706,609. Such feeders typically comprise a circular wall of steel bars. A cylindrical bale is placed within the feeder, and the bars provide slots through which an animal places its head to access the hay.

Such feeders work relatively well to feed cattle and prevent feed from being trampled upon. Once a substantial portion of the bale has been eaten, however, it is often difficult for animals to access the interior portions of the bale. While prior art devices are designed to allow an animal to push the entire structure to access the interior portion of the bale, such structures are often difficult to move. The size and bulk of these prior art feeders makes it difficult for smaller or weaker animals to access the interior of the bale.

An additional drawback associated with these prior art devices is the difficulty in manipulating such livestock feeders and moving them from one place to another. The structures are typically rigid, heavy and large, making them cumbersome to transport.

The difficulties in the prior art discussed here and above are substantially eliminated by the present invention.

SUMMARY OF THE INVENTION

The present invention provides a collapsible livestock feeder having a first feeder section, a second feeder section and a third feeder section. Each of the feeder sections includes a feed retainer and a hold back secured to the retainer. Means are provided for pivotally securing the first feeder section to the second feeder section, the second feeder section to the third feeder section, and the third feeder section to the first feeder section.

In the preferred embodiment, the means for securing the third feeder section to the second feeder section is three additional feeder sections. This arrangement produces a hexagonal enclosure of a sufficient size to surround a round hay bale. In the preferred embodiment, the feeder sections are less than 110 cm wide. This small size allows for easy take down, transport and set up. The feeder sections may be constructed of plastic, metal, or any suitable material.

BRIEF DESCRIPTION OF THE DRAWINGS

FIG. 3 is a side perspective view of the first feeder section of FIG. 1;

FIG. 8 is a rear perspective view of an alternative embodiment of a feeder section for a collapsible livestock feeder.

DETAILED DESCRIPTION OF THE PREFERRED EMBODIMENT

Figure 4:
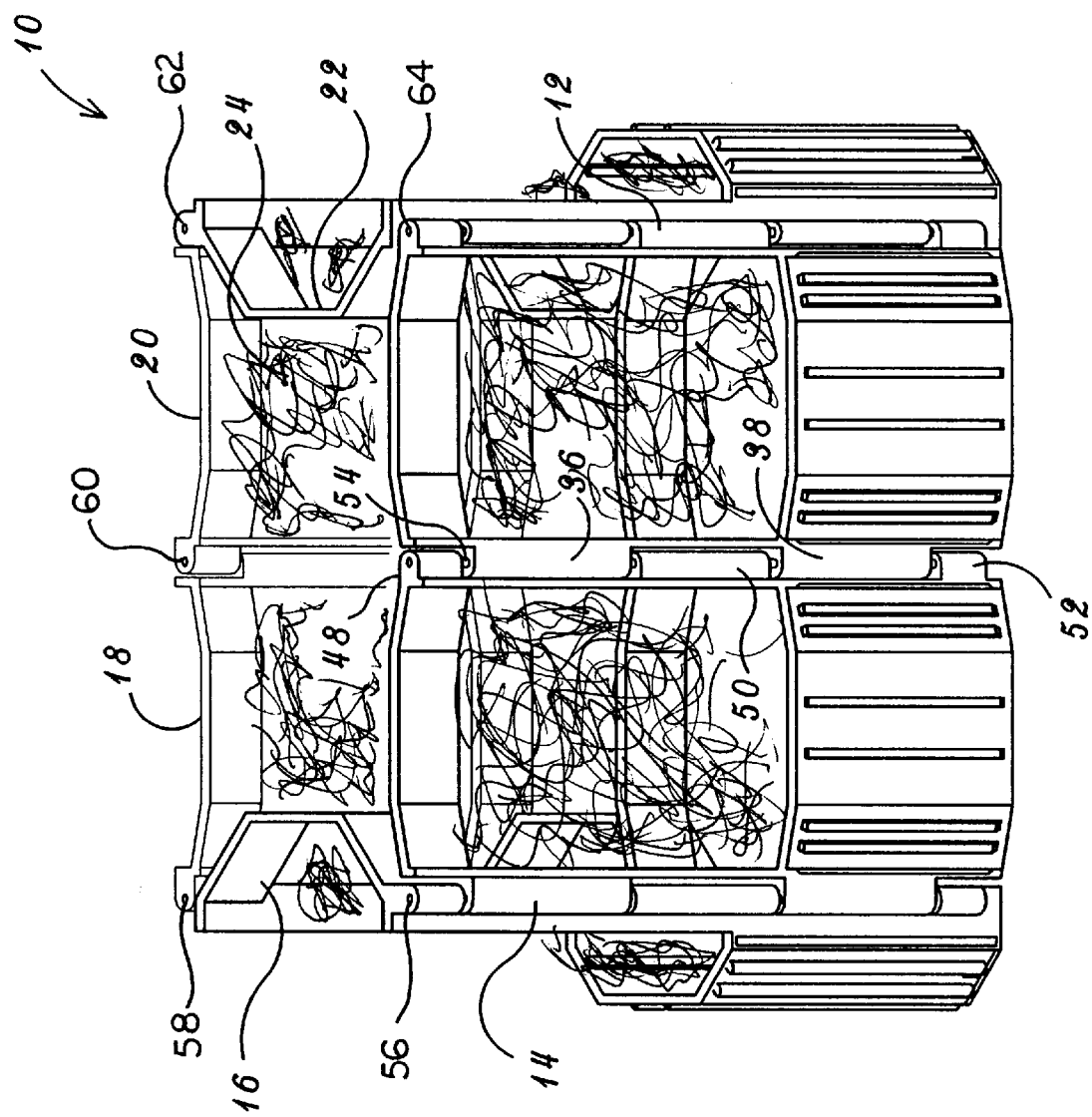
FIG. 4 is a top perspective view of the collapsible livestock feeder of the present invention.

A collapsible livestock feeder is indicated generally as 10 in FIG. 4. The feeder 10 includes a first feeder section 12, a second feeder section 14, a third feeder section 16, a fourth feeder section 18, a fifth feeder section 20 and a sixth feeder section 22. The feeder sections 12, 14, 16, 18, 20 and 22 are pivotally secured to one another around a round hay bale 24.

Figure 1:
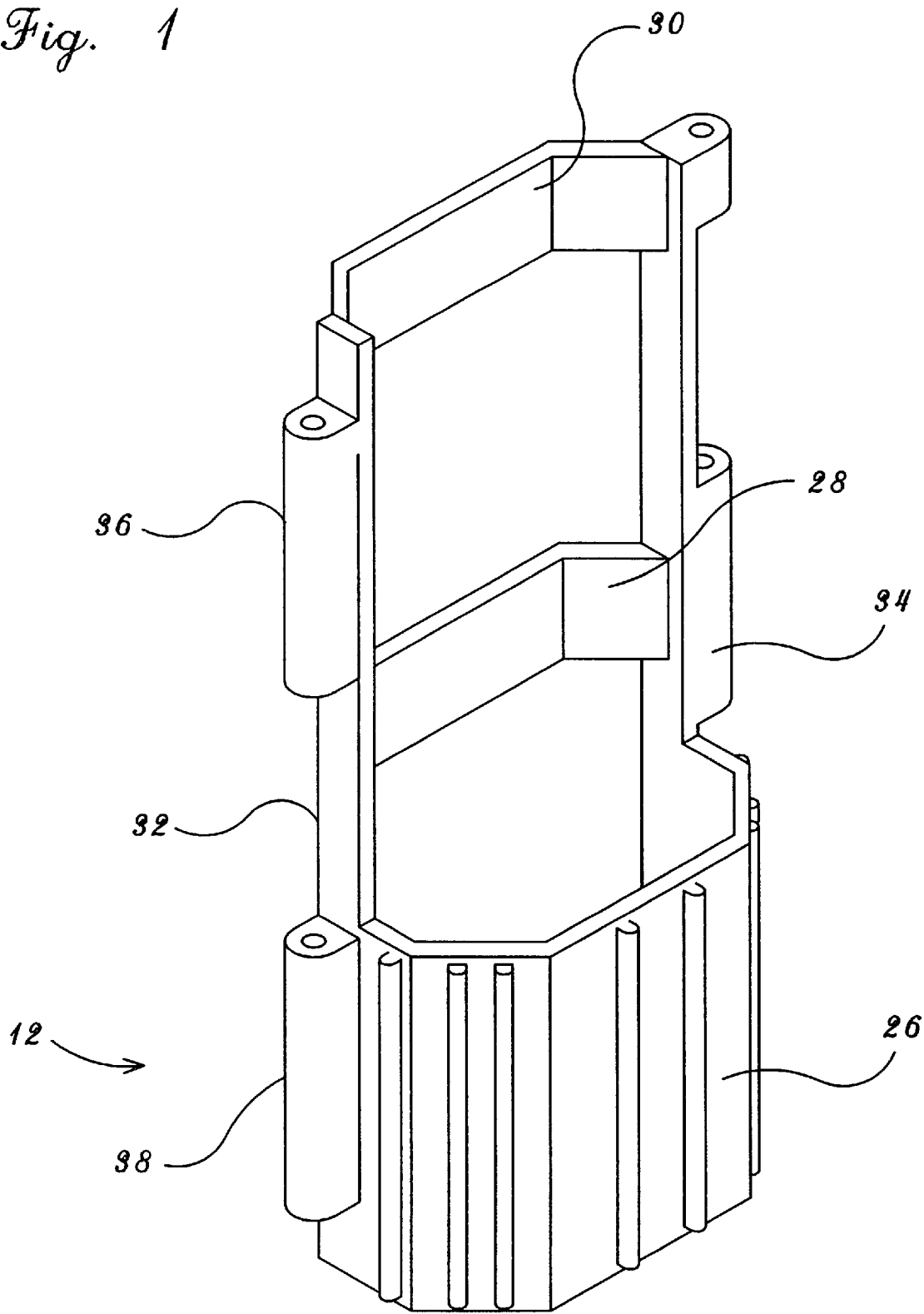
FIG. 1 is a front perspective view of the first feeder section of the present invention.

As shown in FIG. 1, the first feeder section 12 includes a feed retainer 26 a hold back 28, and top 30. The feed retainer 26 hold back 28 and top 30 are secured to one another by a first post 32 and second post 34. In the preferred embodiment, the first feeder section 12 is molded in one piece, out of a suitable plastic material such as those well known in the art.

Figure 2:
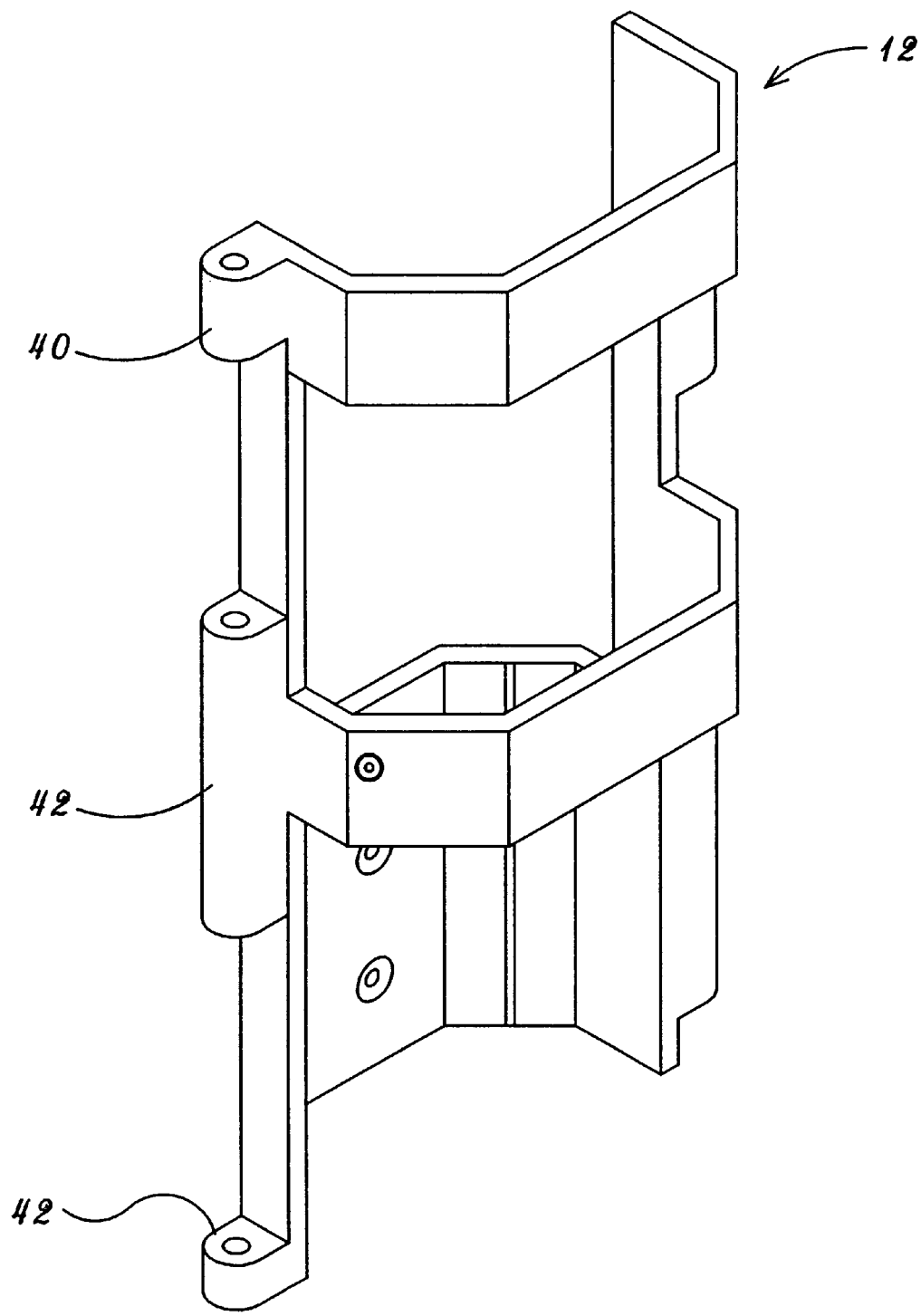
FIG. 2 is a rear perspective view of the first feeder section of FIG. 1.

As shown in FIG. 1, the first post 32 is provided with a first knuckle 36 and a second knuckle 38. As shown in FIG. 2, the second post 34 is provided with a third knuckle 40 a fourth knuckle 42, and a fifth knuckle 44. As shown in FIG. 3, the feed retainer 26 extends forwardly of the first post 32 and second post 34. The hold back 28 and top 30 extend rearwardly of the first post 32 and second post 34. The forward location of the feed retainer 26 and rearward location of the hold back 28 form a feed space 46. The feed space 46 provides an area wherein an animal, not shown, may feed.

As shown in FIG. 4, the second feeder section 14 is provided with a sixth knuckle 48, a seventh knuckle 50 and an eighth knuckle 52. When it is desired to operate the feeder 10 of the present invention, the first feeder section 12 is pivotally secured to the second feeder section 14 and sixth feeder section 22 as shown in FIG. 4. As shown in FIG. 4, the second feeder section 14 is secured to the first feeder section 12 by a first pintle 54. The first pintle 54 is preferably a plastic or metal post, which passes through the sixth knuckle 48 of the second feeder section 14, the first knuckle 36 of the first feeder section 12, the seventh knuckle 50 of the second feeder section 14, the second knuckle 38 of the first feeder section 12, and the eighth knuckle 52 of the second feeder section 14. When secured in this manner, the first feeder section 12 is free to pivot in relationship to the second feeder section 14. In a similar matter, the second feeder section 14 is secured to the third feeder section 16 by a second pintle 56, the third feeder section 16 is secured to the fourth feeder section 18 by a third pintle 58, the fourth feeder section 18 is connected to the fifth feeder section 20 by a fourth pintle 60, the fifth feeder section 20 is connection to the sixth feeder section 22 by a fifth pintle 62 and the sixth feeder section 22 is connected to the first feeder section 12 by a sixth pintle 64.

Figure 5:
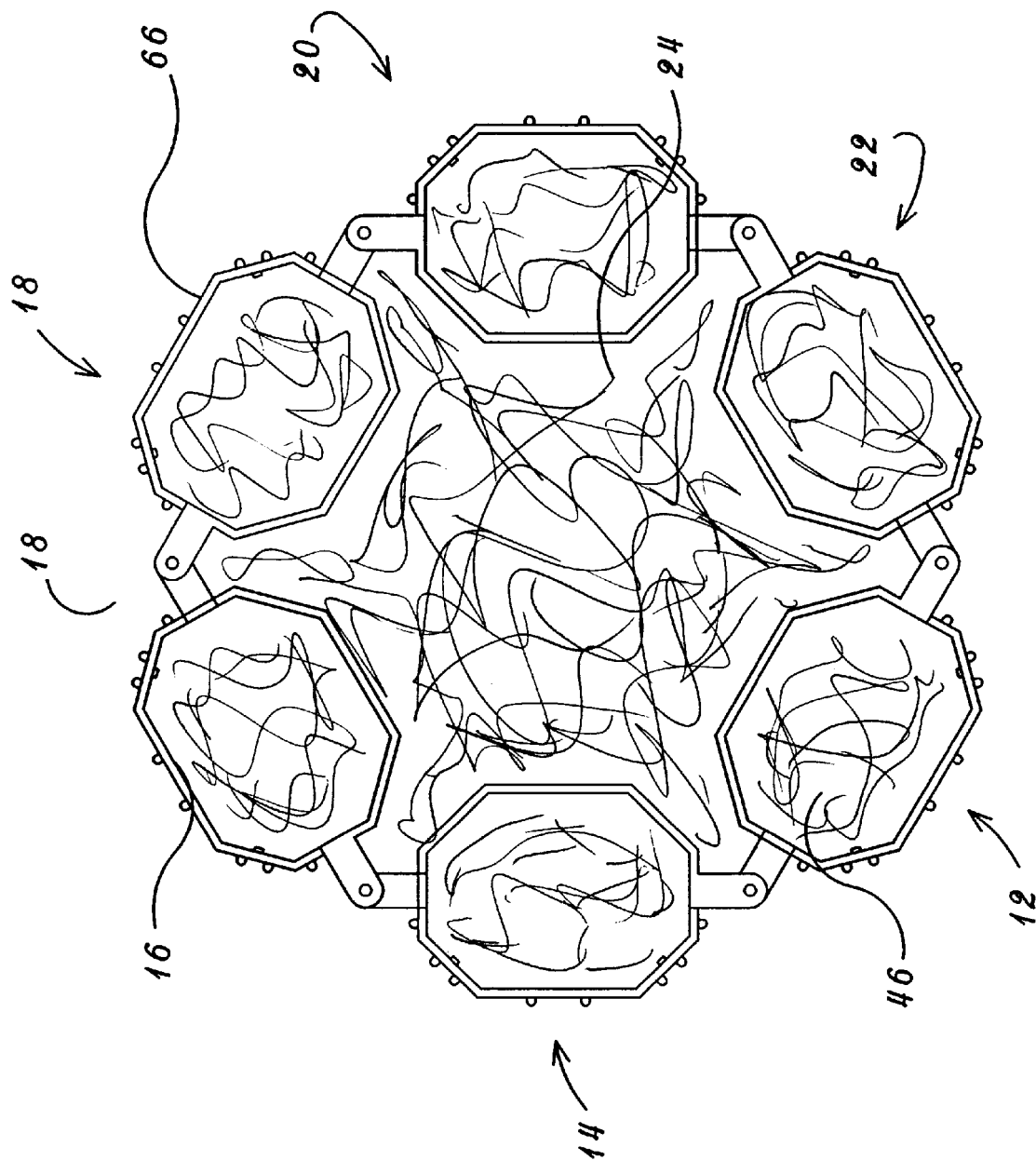
FIG. 5 is a top elevation of the collapsible livestock feeder of FIG. 4.

As shown in FIG. 5, when the feeder sections 12, 14, 16, 18, 20 and 22 are pivotally secured to one another around the round hay bale 24, animals (not shown) can access hay 66 through the feed space 46 of each of the feeder sections 12, 14, 16, 18, 20 and 22.

Figure 6:
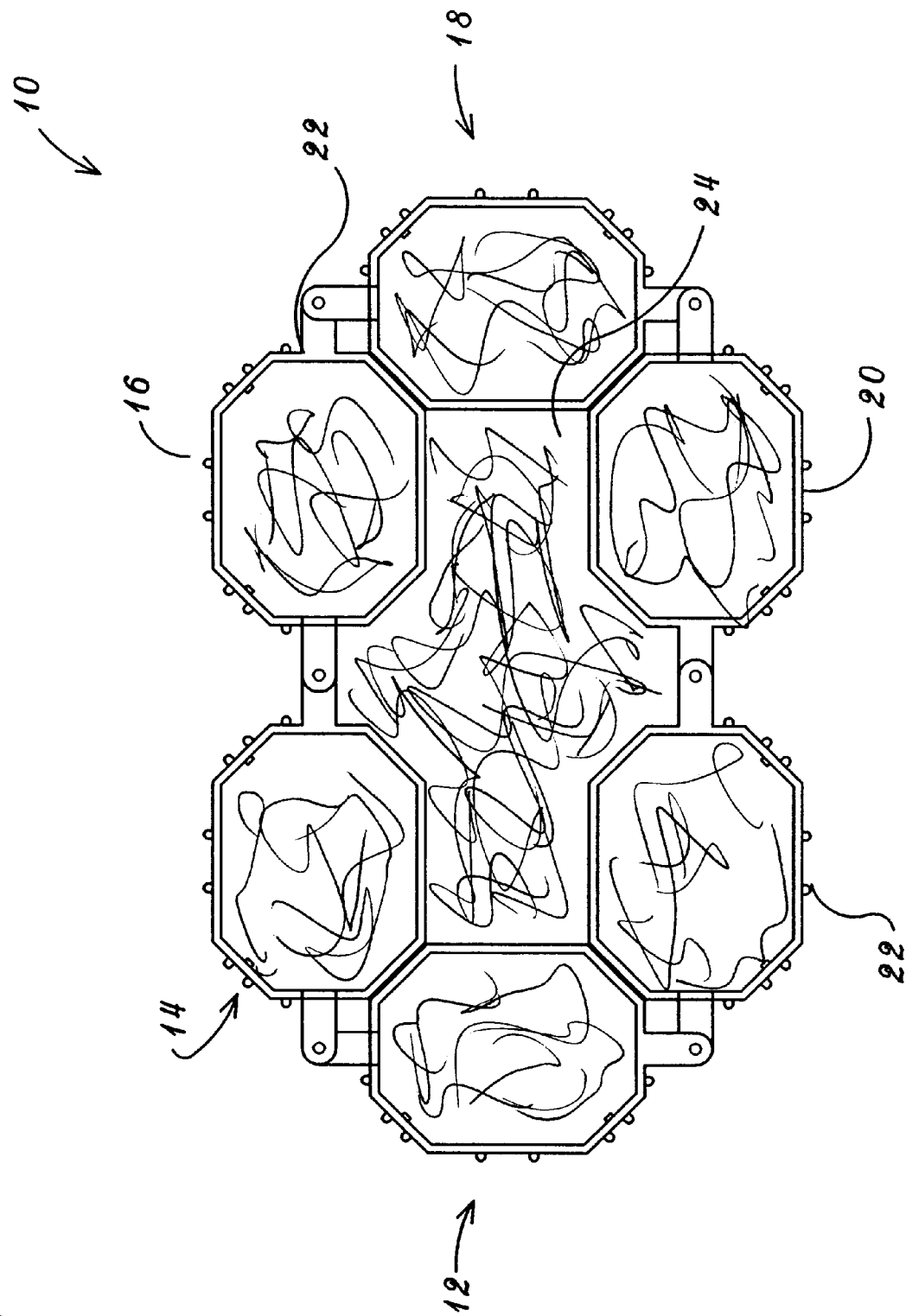
FIG. 6 is a top elevation showing the collapsible livestock feeder of FIG. 5 in the partially collapsed orientation.

Since the feeder sections pivot in relationship to one another, as more and more hay 66 is eaten, the animals can push the feeder sections inward as shown in FIG. 6, without having to move the entire feeder 10. Once an animal has cleared the feed space 46 of feed, the animal reaches inward toward the center of the round hay bale 24 to obtain additional feed. As the animal reaches inward, the animal contacts the hold back 28. As the animal continues to push inward, the hold back 28 and entire feeder section 12 are moved inward, thereby positioning additional hay 66 within the feed space 46 of the feeder section 12 (FIGS. 1 and 6). Instead of having to move the entire feeder 10, as is the case in prior art devices, an animal must only move a few feeder sections 12, 14 and 22 to position more hay 66 within the feed space 46. This allows the interior portion of the round hay bale 24 to be accessed by smaller and weaker animals with a minimal amount of effort.

Figure 7:
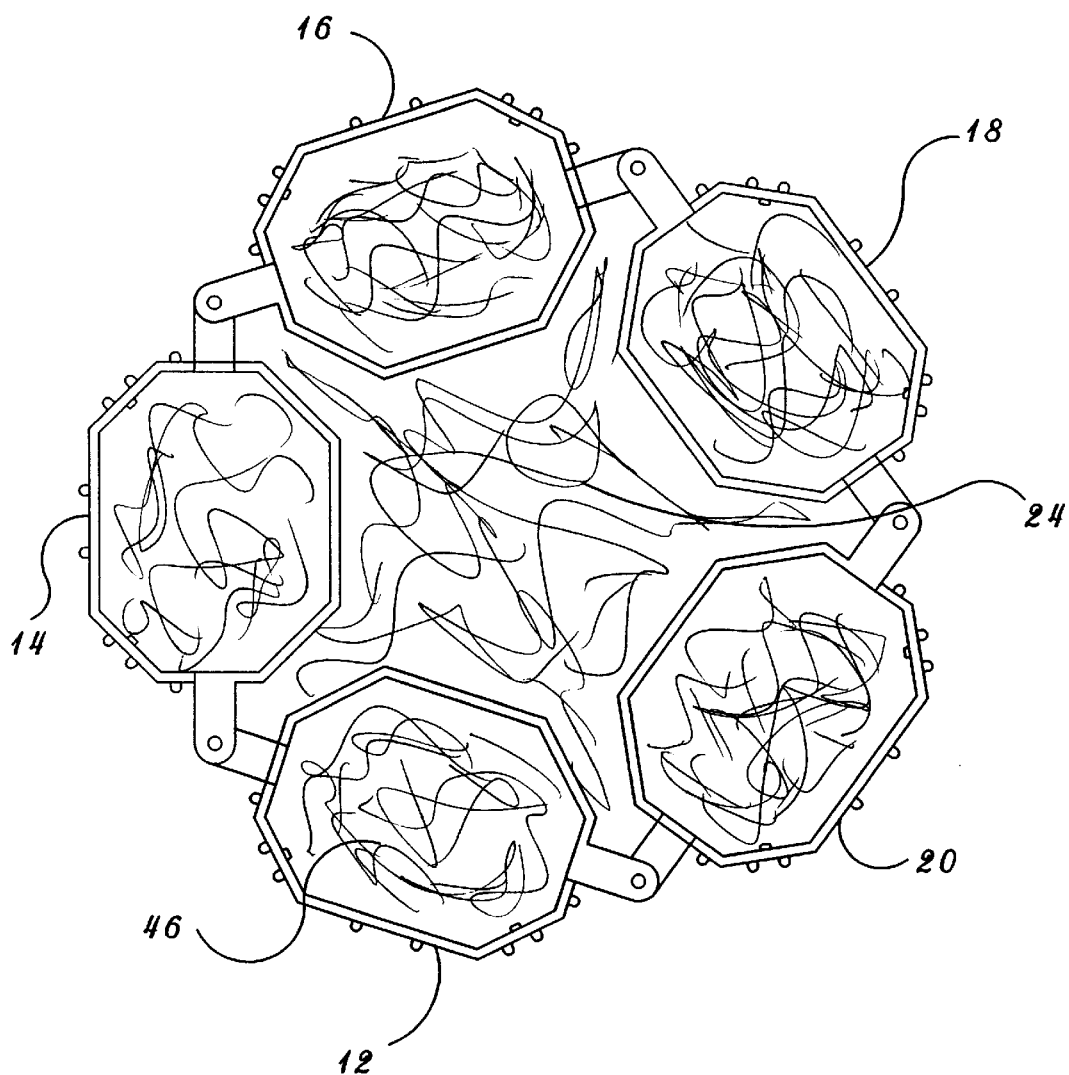
FIG. 7 is a top elevation of the collapsible livestock feed of the present invention shown with one of the feeder sections removed.

Once a sufficient amount of the round hay bale 24 has been eaten, the sixth feeder section 22 and sixth pintle 64 may be removed, as shown in FIG. 7. The fifth pintle 62 is then positioned to pivotally secure the fifth feeder section 20 to the first feeder section 12. In this configuration, animals continue to push the feeder 10 inward to access the interior of the round hay bale 24. Once a sufficient amount of the round hay bale 24 has been eaten, the fifth feeder section 20 and fifth pintle 62 may be removed. The fourth pintle 60 may then be positioned to pivotally secure the fourth feeder section 18 to the first feeder section 12. By providing pivotal feeder sections, and allowing for the removal thereof as the round hay bale 24 gets eaten, a greater amount of the round hay bale 24 is accessible to animals and smaller and weaker animals are more able to reach the interior of the round hay bale 24.

Shown in FIG. 8, is an alternative embodiment of the present invention showing an alternative feeder section 68 constructed of steel or similar metal. As shown in FIG. 8, the alternative feeder section 68 includes a feed retainer 70, a vertical hold back bar 72 and a curved support post 74 secured to both the feed retainer 70 and hold back bar 72. The alternative feeder section 68 can be secured to similar feeder sections (not shown) or the like for use as described above.

Although the invention has been described with respect to a preferred embodiment thereof, it is to be understood that it is not to be so limited, since changes and modifications can be made therein which are within the full and intended scope of this invention as defined by the appended claims.

What is claimed is:

1. A collapsible livestock feeder comprising:
   (a) a first feeder section comprising:
      (i) a first feed retainer;
      (ii) a first holdback secured to said first feed retainer;
   (b) a second feeder section comprising:
      (i) a second feed retainer;
      (ii) a second holdback secured to said second feed retainer;
   (c) a third feeder section comprising:
      (i) a third feed retainer;
      (ii) a third holdback secured to said third feed retainer;
   (d) first means for pivotally securing said first feeder section to said second feeder section;
   (e) second means for pivotally securing said second feeder section to said third feeder section; and
   (f) third means for pivotally securing said third feeder section to said first feeder section.

2. The collapsible livestock feeder of claim 1, wherein said third securing means is a fourth feeder section.

3. The collapsible livestock feeder of claim 1, wherein said third securing means is a plurality of feeder sections.

4. The collapsible livestock feeder of claim 1, wherein said first feeder section, said second feeder section and said this feeder section are each less than 110 centimeters wide.

5. A collapsible livestock feeder comprising:
   (a) a first feeder section comprising:
      (i) a first feed retainer;
      (ii) a first substantial vertical holdback bar secured to said first feed retainer;
   (b) a second feeder section comprising:
      (i) a second feed retainer;
      (ii) a substantially vertical second holdback bar secured to said second feed retainer;
   (c) a third feeder section comprising:
      (i) a third feed retainer;
      (ii) a third substantially vertical holdback bar secured to said third feed retainer;
   (d) first means for pivotally securing said first feeder section to said second feeder section;
   (e) second means for pivotally securing said second feeder section to said third feeder section; and
   (f) third means for pivotally securing said third feeder section to said first feeder section.

6. The collapsible livestock feeder of claim 5, wherein said third securing means is a fourth feeder section.

7. The collapsible livestock feeder of claim 5, wherein said third securing means is a plurality of feeder sections.

8. The collapsible livestock feeder of claim 5, wherein said first feeder section, said second feeder section and said third feeder section are each less than 110 centimeters wide.

* * * * *